(12) United States Patent
Speil et al.

(10) Patent No.: US 6,651,329 B2
(45) Date of Patent: Nov. 25, 2003

(54) METHOD OF MAKING A LEVER-TYPE CAM FOLLOWER

(75) Inventors: Walter Speil, Ingolstadt (DE); Martin Jäkel, Altendorf (DE)

(73) Assignee: Ina Walzlager Schaeffler oHG (DE)

( * ) Notice: Subject to any disclaimer, the term of this patent is extended or adjusted under 35 U.S.C. 154(b) by 44 days.

(21) Appl. No.: 09/989,869

(22) Filed: Nov. 19, 2001

(65) Prior Publication Data

US 2002/0068153 A1 Jun. 6, 2002

(30) Foreign Application Priority Data

Nov. 30, 2000 (DE) .......................... 100 59 545

(51) Int. Cl.[7] ............................................... B23P 15/00
(52) U.S. Cl. ........................................ 29/888.2; 29/888
(58) Field of Search .............................. 29/888.2, 888; 123/90.41, 90.39, 90.42, 90.43; 74/559

(56) References Cited

U.S. PATENT DOCUMENTS

| | | | | |
|---|---|---|---|---|
| 5,819,694 A | * | 10/1998 | Trutescu et al. | 123/90.43 |
| 5,983,848 A | * | 11/1999 | Calka | 123/90.42 |
| 6,182,626 B1 | * | 2/2001 | Geus et al. | 123/90.39 |
| 6,199,527 B1 | * | 3/2001 | Okubo et al. | 123/90.41 |
| 6,279,525 B1 | * | 8/2001 | Speil | 123/90.41 |
| 6,467,166 B1 | * | 10/2002 | Saiki et al. | 29/888.1 |
| 6,470,842 B2 | * | 10/2002 | Speil | 123/90.41 |
| 2002/0043233 A1 | * | 4/2002 | Speil | 123/90.39 |

* cited by examiner

Primary Examiner—I Cuda Rosenbaum
(74) Attorney, Agent, or Firm—Muserlian, Lucas and Mercanti

(57) ABSTRACT

The inventions provides a method of making a lever-type cam follower (2) out of thin-walled light-weight sheet metal for loading at least one gas exchange valve of an internal combustion engine, said cam follower comprising two side walls (12a, 12b) which, together with a crossbeam (11) that connects these side walls to each other, form a U-shaped cross-sectional profile pointing away from the gas exchange valve, the cam follower further comprising two finger-like tabs (5a, 5b) for receiving a stem end of the gas exchange valve, which tabs are configured on one end (3) of the cam follower (2) as extensions of the side walls (12a, 12b) and are bent through 180° onto an undersurface (9) of the crossbeam (11), said method comprising the following steps which may be supplemented with further intermediate steps:
a) punching out a blank (1) out of sheet metal with the tabs (5a, 5b) being bulged outward in arc-shaped curves that are configured as mirror images of each other in respect of a central longitudinal axis (4) of the cam follower (2),
b) bending or deep drawing the side walls (12a, 12b) so that they extend at right angles to the crossbeam (11), and
c) bending the tabs (5a, 5b) onto the undersurface (9) of the crossbeam (11). By punching out the tabs (5a, 5b) with arc-shaped curves, as described in step a), waste of sheet metal is reduced because the blank has a shorter length.

6 Claims, 1 Drawing Sheet

METHOD OF MAKING A LEVER-TYPE CAM FOLLOWER

FIELD OF THE INVENTION

The invention concerns a method of making a lever-type cam follower out of thin-walled light-weight sheet metal for loading at least one gas exchange valve of an internal combustion engine, said cam follower comprising two side walls which, together with a crossbeam that connects these side walls to each other, form a U-shaped cross-sectional profile pointing away from the gas exchange valve, the cam follower further comprising two finger-like tabs for receiving a stem end of the gas exchange valve, which tabs are configured on one end of the cam follower as extensions of the side walls and are bent through 180° onto an undersurface of the crossbeam.

The invention further concerns a flat sheet metal blank for forming a lever-type cam follower for loading at least one gas exchange valve of an internal combustion engine, said blank, as seen in a top view, having a substantially rectangular geometry, and two-finger-like tabs extending from one end of the blank being configured as mirror images of each other in respect of a central longitudinal axis of the blank.

BACKGROUND OF THE INVENTION

A cam follower of the pre-cited type disclosed in DE-OS 198 11 658 comprises two finger-like tabs on one end. The tabs are configured as extensions of the side walls of the cam follower and are bent onto its undersurface. A gas exchange valve can be received between the tabs. Punching-out of the blank for making the cam follower results in the production of an unnecessarily large amount of chippings. This is due to the relatively large length of the tabs. In the prior art, a blank of this type is punched out of a sheet metal strip, with the tabs having a straight and parallel configuration (see, for example, DE-OS 198 10 462, FIG. 4). This unnecessarily increases the length of the blank. As a result, only a disproportionately small number of blanks can be cut from a given length of strip. The aforesaid chippings unnecessarily increase the material costs.

OBJECTS OF THE INVENTION

It is a first object of the invention to provide a method of making a lever-type cam follower out of thin-walled light-weight sheet metal which avoids the initially described drawbacks with simple measures.

It is a second object of the invention to provide a sheet metal blank which avoids the initially described drawbacks with simple measures.

These and other objects and advantages of the invention will become obvious from the following detailed description.

SUMMARY OF THE INVENTION

The invention achieves its first object by the fact that the method comprises the following steps, which may be supplemented with further intermediate steps:

a) punching out a blank out of sheet metal with the tabs being bulged outward in arc-shaped curves that are configured as mirror images of each other in respect of a central longitudinal axis of the cam follower,
b) bending or deep drawing the side walls so that the side walls extend at right angles to the crossbeam, and
c) bending the tabs onto the undersurface of the crossbeam.

The invention achieves its second object by the fact that the tabs are bulged outward in arc-shaped curves that are configured as mirror images of each other.

Due to the arc shape of the tabs the length of the blank is markedly shorter than that known from the prior art. This results in a significant reduction of punching waste. This is particularly remarkable if the blank is cut out of a sheet metal strip. It must further be noted that due to the bending radius already included in the tabs, the final bending of the tabs onto the undersurface is not only simpler but also gentler to the material.

Ends of the tabs comprise extensions that serve as welding studs for connection to the undersurface of the crossbeam following the bending-over of the tabs onto this undersurface. This is a simple manner of achieving an excellent positional fixing of the tabs on the cam follower in the crosswise direction of the cam follower.

Due to the fact that the vertices of the tabs that point with their ends preferably towards a central longitudinal axis of the blank are situated within a cutting width of the blank, it is possible to use a relatively narrow sheet metal strip. The width of the entire work-piece holding device is thus likewise advantageously minimized.

The proposed U-shape of the cam follower endows this with an excellent rigidity. The invention is primarily directed to a cam follower configured as a finger lever or a rocker arm but can equally well be implemented on an oscillating arm.

Although the invention proposes an outwards bulging arc-shape of the tabs, it is also conceivable to make the tabs with an inward bulge so that their vertices are situated in directly opposing relationship to each other.

The ends of the tabs of the flat blank are spaced from each other to a certain extent. This spacing is to be seen as a compulsory width required for the punching tool. Further, it is also possible to make the outer sides of the tabs not directly as extensions of the long sides of the blank, as claimed, but to arrange them slightly offset inwards relative to the end of the blank.

Conceivable and within the scope of the invention are also a variety of cross-sectional profiles of the cam follower including completely or nearly flat profiles.

For a better understanding, the invention is described below with reference to the appended drawings.

DETAILED DESCRIPTION OF THE DRAWINGS

Figure 1:
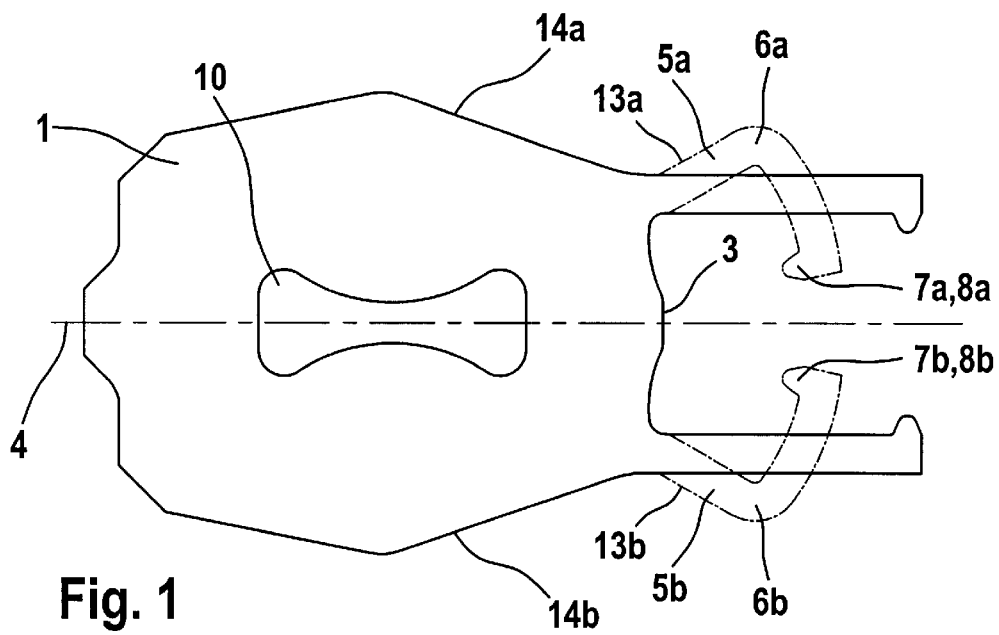
FIG. 1 shows a punched-out blank for a cam follower comprising bent tabs.
Figure 2:
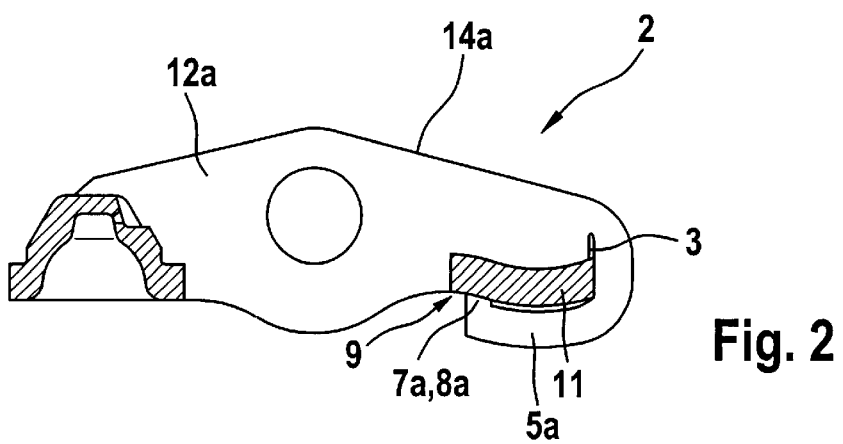
FIG. 2 is a longitudinal section of a finished cam follower.
Figure 3:
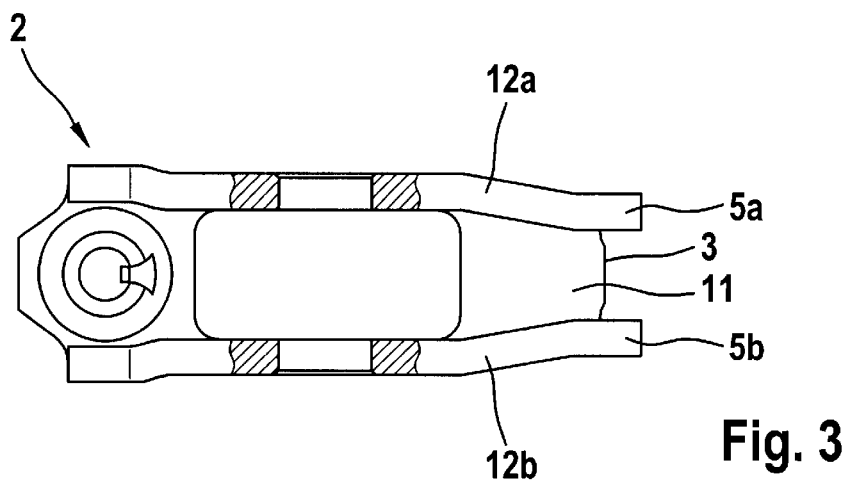
FIG. 3 is a top view of the cam follower of FIG. 2.

FIG. 1 shows a flat sheet metal blank 1 for forming a lever-type cam follower 2 as disclosed in FIGS. 2 and 3. This cam follower is configured as a finger lever and is intended to serve for loading a gas exchange valve of an internal combustion engine.

FIG. 1 expediently shows the blank 1 in a top view. In this view, the blank 1 has a substantially rectangular shape. This figure shows the blank 1 during the fabrication process of the cam follower 2 as it appears immediately after it has been punched out of sheet metal, for example out of a sheet metal strip.

Two tabs 5a and 5b equally spaced from a central longitudinal axis 4 of the blank 1 are integrally punched on one end 3 of the blank 1. In the punched-out state of the blank 1, the tabs 5a, 5b already have a curved shape which is represented in broken lines in FIG. 1. The straight tabs shown in this figure illustrate the prior art configuration of such tabs. The figure makes it clear that the tabs 5a, 5b of the invention are bulged outwards and that their vertices 6a, 6b lie within a cutting width of the blank 1.

Extensions 8a, 8b are configured on ends 7a, 7b of the tabs 5a, 5b. With the help of these extensions 8a, 8b, a welded connection is made with an undersurface 9 of a crossbeam 11 of the cam follower 2 after the tabs 5a, 5b have been bent onto this undersurface 9. The tabs 5a, 5b are configured so that their outer sides 13a, 13b form extensions of the long sides 14a, 14b of the blank 1.

Finally, the recess 10 situated approximately at the center of the blank 1, as shown in FIG. 1, serves to form a roller pocket, not specifically described herein, on the crossbeam 11.

When the profile of the blank 1 comprising the bent tabs 5a, 5b as shown in FIG. 1 has been punched out, the side walls 12a, 12b are bent so that the crossbeam 11 is enclosed between them, and the cam follower 1 as a whole has a U-shaped cross-sectional profile. In a subsequent work step, the tabs 5a, 5b are bent onto the undersurface 9 of the cam follower 2, as best seen in FIG. 2 by a person skilled in the art. Following this, in a last step, the tabs 5a, 5b are joined to the undersurface 9 through their extensions 8a, 8b by welding.

Due to the fact that in the punched-out state of the blank 1, the tabs 5a, 5b have a curved shape, the overall length of the blank 1 is significantly shortened. This leads to a considerable saving of sheet metal in large series production.

What is claimed is:

1. A method of making a lever-type cam follower out of thin-walled light-weight sheet metal for loading at least one gas exchange valve of an internal combustion engine, said cam follower comprising two side walls which, together with a crossbeam that connects these side walls to each other, form a U-shaped cross-section profile pointing away from the gas exchange valve, the cam follower further comprising two finger-like tabs for receiving a stem end of the gas exchange valve, which tabs are configured on one end of the cam follower as extensions of the side walls and are bent through 180° onto an undersuface of the crossbeam, said method comprising the following steps:
    a) punching out a blank out of sheet metal with the tabs being bulged outward in arc-shaped curves that are configured as mirror images of each other in respect of a central longitudinal axis of the cam follower,
    b) bending or deep drawing the side walls so that the side walls extend at right angles to the cross beam, and
    c) bending the tabs onto the undersurface of the crossbeam.

2. A method of claim 1, wherein ends of the tabs comprise extensions, through which a welded connection is made with the undersurface of the crossbeam.

3. A method of claim 1, wherein the tabs are bent onto the undersurface of the crossbeam so as to bear at least approximately on the crossbeam.

4. A method of claim 2, wherein the tabs are bent onto the undersurface of the crossbeam so as to bear at least approximately on the crossbeam.

5. A method of claim 1, wherein the vertices of the arc-shaped curves of the tabs are situated within a cutting length of the blank.

6. A method of claim 1, wherein the tabs are punched-out integrally on the end of the blank so that outer sides of the tabs form extensions of long sides of the blank.

* * * * *